United States Patent [19]

Buckley et al.

[11] Patent Number: 4,550,482
[45] Date of Patent: Nov. 5, 1985

[54] METHOD OF CONSTRUCTING A BEAM SPREAD LENS

[75] Inventors: Galen L. Buckley, Irvine; Paul L. Fox, Whittier, both of Calif.

[73] Assignee: Pyramid Optical, Inc., Irvine, Calif.

[21] Appl. No.: 564,566

[22] Filed: Dec. 22, 1983

[51] Int. Cl.$^4$ ................................................ B23P 17/00
[52] U.S. Cl. ...................................... 29/412; 29/558; 76/101 A; 51/284 R; 51/293; 350/320
[58] Field of Search ................ 29/412, 557, 558; 76/101 R, 101 A; 51/284 E, 284 R, 5, 293; 83/17; 350/320

[56] References Cited

U.S. PATENT DOCUMENTS

| | | | |
|---|---|---|---|
| 3,123,954 | 3/1964 | Calkins | 51/284 R |
| 3,492,764 | 2/1970 | Dalton | 51/284 R |
| 3,494,231 | 2/1970 | Le Vantine | 51/284 R |
| 3,541,825 | 11/1970 | Reader et al. | 350/320 UX |
| 3,932,148 | 1/1976 | Krewalk, Sr. | 51/284 R |
| 4,066,887 | 1/1978 | Levis | 350/320 X |
| 4,074,416 | 2/1978 | Rambauski et al. | 350/320 X |
| 4,093,354 | 6/1978 | Fletcher | 350/320 |
| 4,336,978 | 6/1982 | Suzuki | 350/320 X |
| 4,375,739 | 3/1983 | Machida et al. | 51/284 R |

*Primary Examiner*—Charlie T. Moon
*Attorney, Agent, or Firm*—Leonard Tachner

[57] ABSTRACT

A method of constructing a lens of the type receiving a collimated beam of input radiation for transmitting a narrow sheet of output radiation of substantially uniform intensity over an angular range of approximately + and −45 degrees relative to the input radiation beam. The method includes steps relating to defining the lens surface geometry and to implementing that geometry on a transmissive material having an index of refraction no greater than 1.6. The implementation of the method employs grinding and polishing steps which may be carried out by a disclosed lapping machine.

1 Claim, 12 Drawing Figures

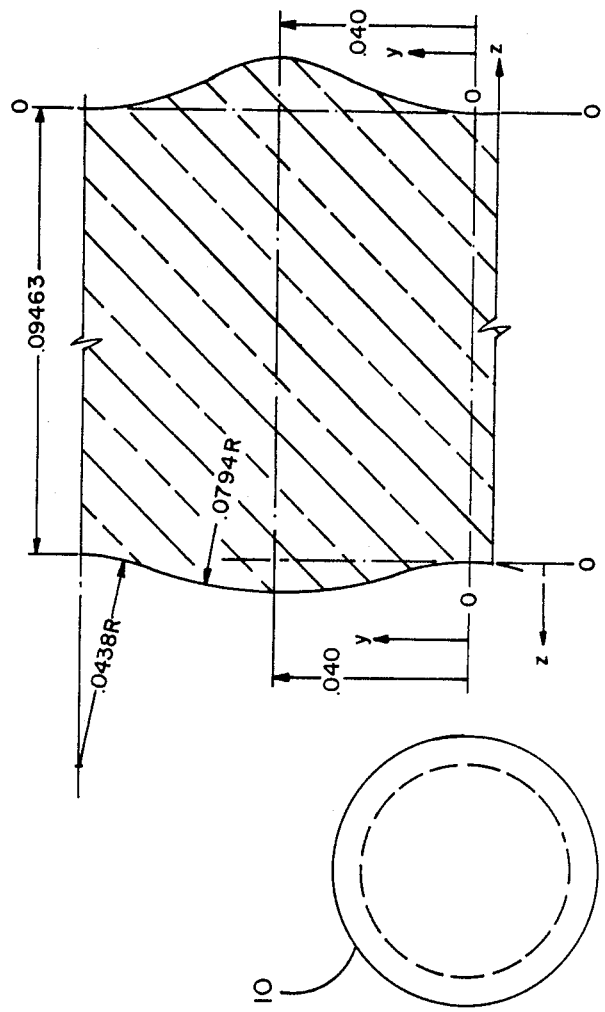
FIG. 7
FIG. 9
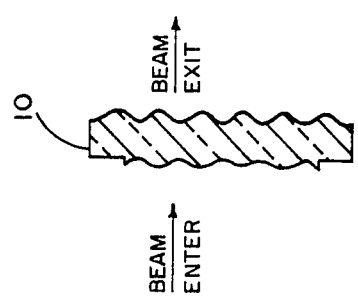
FIG. 8

METHOD OF CONSTRUCTING A BEAM SPREAD LENS

BACKGROUND OF THE INVENTION

1. Field of the Invention

The present invention pertains generally to the field of optical lenses and more specifically, to a line lens or beam spreader lens for converting a narrow, round beam of radiation into a uniformly dispersed sheet of radiation.

2. Prior Art

A lens which converts a narrow, round beam of radiation into a uniformly distributed sheet of radiation finds its principal usefulness in military applications such as laser scan radar. It is well-known that a round beam of radiation when passed through a cylindrically curved refracting surface will be dispersed into a sheet of radiation. However, a number of critical deficiencies are encountered. For example, the span or width of the sheet obtained from practical curvatures of the refracting surface is inadequate in that it does not satisfy the normal requirement for a 90 degree span. Furthermore, if the curvature of the cylinder is sufficiently high, portions of the beam incident on the high angle regions of the surface are severely attenuated and in fact, radiation gaps are produced because the critical angle for total internal reflection will be exceeded for certain portions of the surface. As a result, a relatively non-uniform radiation pattern is produced which may in fact, comprise a plurality of non-radiation regions interspersed therethrough. Still an additional problem encountered in attempting to use a cylindrically curved refracting surface to generate a sheet of radiation from an incident beam, results from the awkward mechanical problems associated with the attempt to concentrate the incident beam over the span of the lens.

A prior art beam spreader lens has overcome the aforementioned problems of a cylindrically curved refracting surface. More specifically, a prior art lens having lenticular elements that are alternately concave and convex has been developed out of an extremely high index of refraction material (LASF9 having an index of refraction of 1.85). The extremely high index of refraction appears to solve the first two of the aforementioned disadvantages of the cylindrically curved refracting surface in that the span or width of the radiation sheet obtained from this prior art lens appears to be substantially adequate and relatively uniform without any severely attenuated segments. Furthermore, the lenticular configuration of the lens appears to overcome the aforementioned centration problem wherein a centrally directed incident beam is all that is required. Unfortunately, the prior art lens introduces a significant new disadvantage particularly in certain military applications where a lens of this type finds its most advantageous application. More specifically, the exposure of the aforementioned prior art lens to any form of heating, darkens the material and changes its optical characteristics rendering its transmission capabilities inadequate for the purpose to which it is applied. For example, in some applications the lens is exposed to atmosphere in a high velocity flight vehicle and in such applications, the air resistance is sufficient to heat the lens to an extent that the aforementioned detrimental optical characteristic changes occur. Consequently, the aforementioned high index of refraction material is not available for use as a line lens wherever that lens may be heated in its application.

There is however a far more suitable material available, namely, glass ceramic sold under such trademarks as ZERODUR and CERVIT. Such glass ceramic is resistant to heating in that it does not substantially change its transmission or other optical characteristics as a result of significantly higher temperatures. Unfortunately, ZERODUR for example has an index of refraction of only 1.544. As a result, the lens structure and geometry utilized to produce the prior art line lens using the aforementioned high index of refraction material, would not produce the same uniformly distributed 90 degree sheet beam in a line lens manufactured from glass ceramic. Consequently, the problem to be solved by the present invention is to provide a line lens which takes advantage of the aforementioned prior art line lens to the extent that it continues to satisfy the requirements of uniform sheet radiation distribution over a 90 degree field with a structural configuration that may be readily produced and at the same time permit the use of glass ceramic which will resist the aforementioned heating effect induced problems despite the significantly lower index of refraction compared to the prior art material discussed above.

SUMMARY OF THE INVENTION

The present invention comprises a novel line lens for producing radiation in the form of a sheet from a collimated round pencil beam of such radiation. The radiation span or width is a minimum of 90 degrees and the radiation pattern is substantially uniform over that 90 degree angle. Furthermore, the lens utilizes the advantageous lenticular construction of the prior art to overcome construction problems associated with centration of the beam over the lens surface. Furthermore, the present invention utilizes a novel design to permit achievement of the aforementioned desirable characteristics despite the fact that the material of which the lens is constructed is a glass ceramic having an index of refraction of 1.544, significantly lower than LASF9 but without the attendant heat-induced degradation of optical characteristics. One line lens embodiment of the present invention achieves the aforementioned advantageous operation by a double power surface element configuration in which both the light incident surface and the light exiting or transmission surface are lenticulated. Both lens surfaces are lenticulated and the lenticulation curve design of one surface is dependent upon the lenticulation curve design of the other. It will be seen hereinafter that the resultant structure of the lens is achieved by a novel design method which is relatively unique as compared to conventional optical lens design techniques.

OBJECTS OF THE INVENTION

It is therefore a principal object of the present invention to provide a line lens for producing radiation in the form of a sheet from a collimated round pencil beam wherein despite the index of refraction of the lens material being no greater than 1.544, the resultant radiation sheet spans an angle of at least 90 degrees and is substantially uniform over that span.

It is an additional object of the present invention to provide a novel design method for calculating the geometrical surfaces of a doubly lenticulated line lens that is capable of producing a sheet of radiation of uniform distribution over an angle of approximately 90 degrees using materials having an index of refraction in the range of 1.45 to 1.6.

It is still an additional object of the present invention to provide a line lens capable of producing a sheet of radiation from a collimated pencil beam wherein the radiation is uniform over an angle of approximately 90 degrees utilizing glass ceramic material and a uniquely configured lenticulated surface on each side of the lens to produce a double power surface element.

BRIEF DESCRIPTION OF THE DRAWINGS

The aforementioned objects and advantages of the present invention as well as additional objects and advantages thereof will be more fully understood hereinafter as a result of a detailed description of a preferred embodiment of the invention when taken in conjunction with the following drawings in which:

FIGS. 7, 8 and 9 are enlarged views side and front respectively illustrating the structural details of the line lens of the present invention.

DETAILED DESCRIPTION OF A PREFERRED EMBODIMENT

Figure 3:
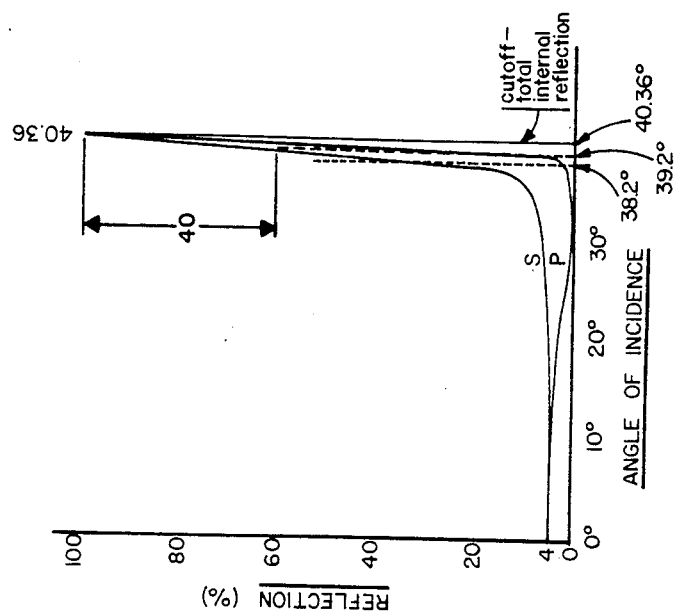
FIG. 3 is a graph illustrating the internal reflection characteristics of a suitable material for producing the line lens of the present invention.
Figure 2:
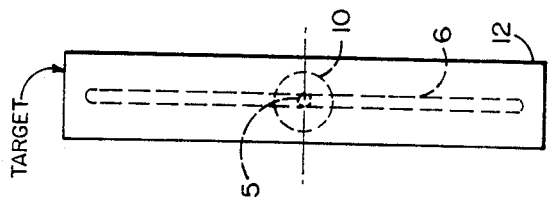
FIG. 2 is a side view of the radiation pattern produced by the invention as illustrated in FIG. 1.
Figure 1:
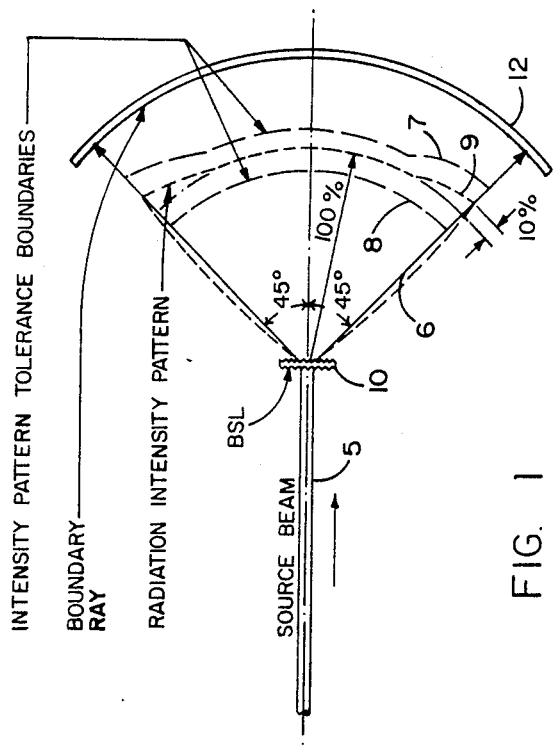
FIG. 1 is an elevational view of the desired radiation pattern produced by the present invention in response to a source beam incident on the line lens of the invention.

Reference will now be made to FIGS. 1, 2 and 3 for a more precise indication of the performance of a line lens or beam spreader lens embodiment of the invention. More specifically, as seen in FIG. 1, an embodiment 10 of the beam spreader lens of the present invention receives a source beam in the form of a collimated beam of approximately 2 millimeters in diameter. It will be understood that the source beam precise shape and dimension is not limitative of the invention. The beam spreader lens 10 of the present invention operates on this incident source beam to produce an output radiation beam 6 shown in FIG. 1. Ideally, the output radiation pattern should comprise a 90 degree wedge that is symmetrical with respect to the normal center line of the lens and is substantially uniform in intensity over the entire spread of the wedge pattern. As seen further in FIG. 1, the actual specification for the output radiation pattern of the lens 10 of the invention permits a certain degree of variation from this ideal pattern as indicated by the tolerance boundaries 7 and 8 which represent permissible intensity variation and which include a designed-in up to 10 percent increase in intensity 9 at wedge angles approaching the outer limits of the beam at + or −45 degrees from the normal to the lens.

For purposes of explanation only, FIG. 1 includes a display target 12 in the form of a rectangle curved to conform to the shape of a portion of a circular rim. Target 12 is seen in side view in FIG. 2 to illustrate the cross sectional representations of the incident source beam 5, the beam spreader lens 10 and the output radiation pattern 6 as it intersects the target 12. Further specifications for the lens 10 of the present invention require that the lens be made of a glass ceramic material as previously discussed. Furthermore, although it will be seen hereinafter that both surfaces of the lens are lenticulated, the nominal thickness or spacing between the refractive surfaces is approximately 1/10 of an inch and the lens has a diameter of approximately 4 millimeters, although these dimensions should not be considered limitative of the invention.

Those having skill in the art to which the present invention pertains will appreciate the fact that in order to design a line lens from a glass ceramic material such as ZERODUR, which has an index of refraction of 1.544, significantly lower than the material LASF 9 previously alluded to, it is necessary to know the material's internal reflection characteristics. It is of particular importance in view of the angular bends of up to 45 degrees for the incoming source beam as seen in FIG. 1 to know the reflection characteristics of the exiting surface as a function of various angles of incidence. Before the detailed design process commences we must know the angle limitations due to the material's reflection characteristics. For this reason reference will now be made to FIG. 3 which comprises a graph showing the reflection characteristics of the exiting surface of a ZERODUR lens. As seen in FIG. 3 there are two curves of reflection characteristics illustrated, one for the plane of polarization parallel to the plane of incidence and one for the plane of polarization normal to the plane of incidence. The limitations dictated by the reflection characteristics as indicated in FIG. 3 have implications on the design of the lens as will be seen hereinafter. As previously indicated, prior art beam spreader lenses were able to achieve an angular beam spread of 90 degrees by using a glass of high index of refraction of approximately 1.8. Because of this high index of refraction and the concomitant high angle of total internal reflection, a prior art lens design utilizing a single lenticulated surface could be achieved because the surface curvatures could be sufficiently high to achieve the 90 degree beam spread. However, because of the substantially lower index of refraction of glass ceramic, surface curvature must be limited to a value which will keep the angle of incidence at the interfaces below about 35 degrees. Higher angles will result in unacceptable transmission losses. As a result, it was clearly necessary to use a double surface refractor to achieve the wider beam spread result with the lower index of refraction. Thus the present invention comprises a double power surface element in which both sides of the lens are lenticulated.

Figure 4:
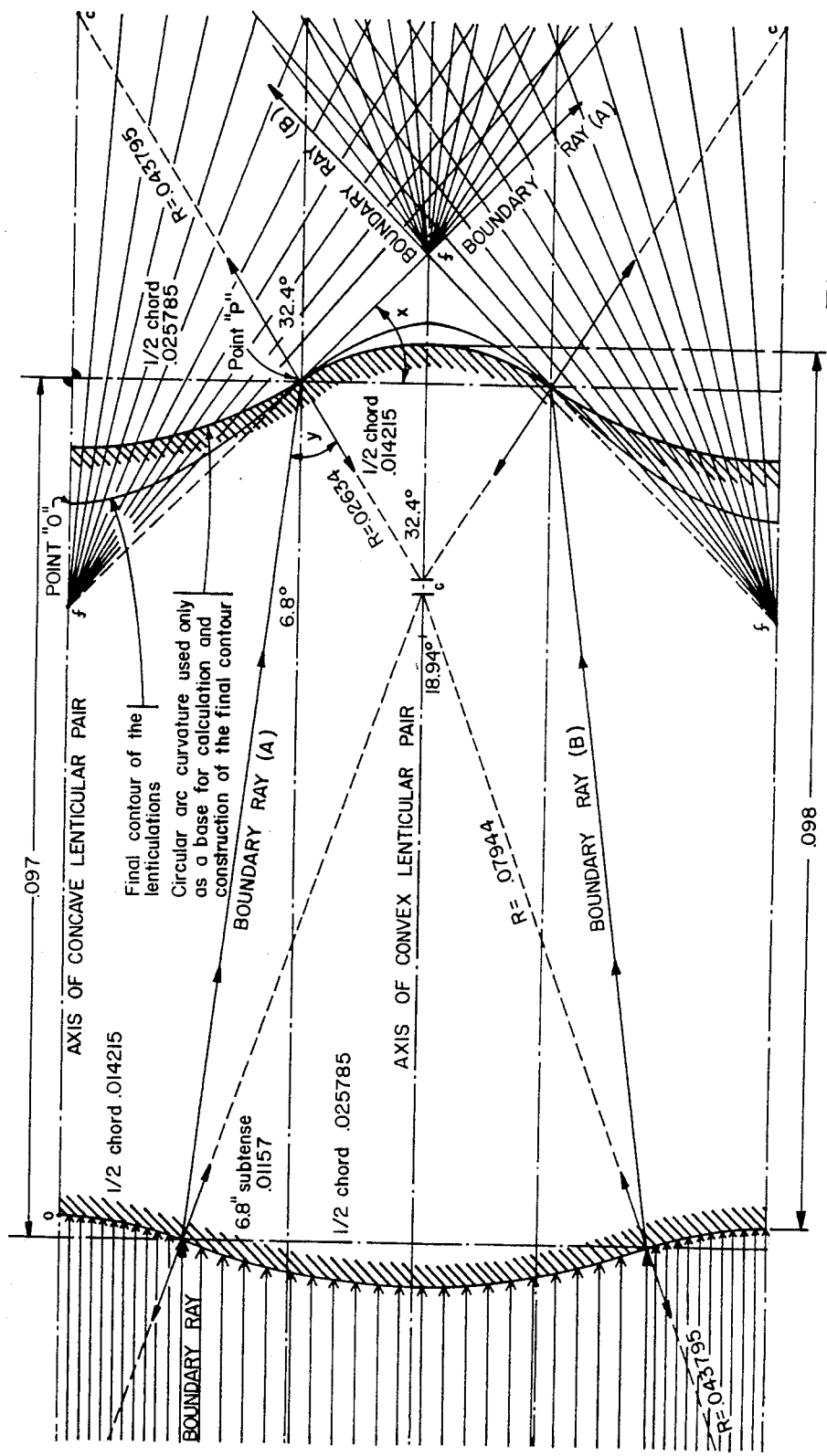
FIG. 4 is a graphical illustration of the construction details used for computing the lenticular surface contours of a line lens of the present invention.

While those having skill in the present art will at once see the clear necessity for using two surfaces with optical power, the means by which the design of such surface curvatures is accomplished is not immediately apparent. In fact, conventional optical computer programs and prescribed design techniques of the prior art have been found inadequate and a unique new design approach was required to produce a successful design of a beam spread lens using a relatively low index of refraction material. This new unique design approach will now be described in conjunction with FIGS. 4, 5 and 6. Referring first to FIG. 4 it will be seen that this figure comprises 100 to 1 scale drawing of a section of a beam spread lens and traces the path of a pair of boundary rays A and B. Only one pair of lenticulations is shown in cross section. This pair is typical of several pairs of lenticulations which comprise the beam spread lens. Each lenticulation covers a span which is less than the source beam diameter and there are sufficient lenticulations to more than cover the full beam diameter of the incident beam source.

Boundary rays A and B establish the angular width of the output sheet of radiation, namely, + or −45 degrees relative to the incident radiation axis. Ahead of the lens, the boundary rays are, of course, parallel to the axis of incident radiation. Within the lens the boundary rays are inclined relative to the lens axis because of the effects of the lenticulations on the input surface. The proportion of bending of the boundary rays at the entering and exiting interface surfaces is established partly by trial and error and partly to satisfy certain conditions and limitations. More specifically, it is to be observed that the pair of lenticular surfaces are each alternately convex and concave. Each convex and concave adjacent pair has an axis and the axis-to-axis spacing has been tentatively and arbitrarily set at 0.04 inches.

For purposes of simplifying curvature calculations and also for optimizing the cosmetic appearance of the lens, the initial choice of inclination angle within the lens was 6.8 degrees and the placement of the boundary ray was halfway between the axes with the output angle of the boundary rays specified as 45 degrees and the angle of the same ray within the lens set at 6.8 degrees. These parameters determine the slope angle of the surface element in the region where the rays intersect the surface and exit into the target or output space. Using Snell's law of refraction, the surface slope angle and the angle of incidence of the ray at the exiting point were calculated and are seen in the right-hand portion of FIG. 4. These angles represented by the letters X and Y in FIG. 4, respectively, were 32.4 degrees and 39.2 degrees, respectively. The 32.4 degrees for the slope angle of the lenticulated surface would be considered acceptable from the standpoint of fabrication difficulty, but the 39.2 degree angle for the angle of incidence of the ray at the exiting point requires closer scrutiny.

More specifically, again referring to FIG. 3, it is seen that the critical angle for total internal reflection of the ZERODUR material is 43.6 degrees. It is also observed that for an angle of incidence of 1 degree less than the cut-off angle of 43.6 degrees, the transmission percentage is down 40 percent average for the two polarized components of the beam. This is, of course, unacceptable because the required performance specification for the beam spreader lens, as discussed earlier in conjunction with FIG. 1, requires better than 100 percent of axial radiation intensity at the 45 degree boundary points. Further inspection of FIG. 3 shows that even if conditions are changed so that the incidence angle is reduced several degrees, the transmission percentage will still be significantly below 100 percent and this figure does not include other factors such as decollimation errors and surface contour errors which also tend to produce transmission losses at the off axis regions of the field of output radiation.

Clearly it is necessary to find an alternative way to build up the energy transmission at the boundaries of the output radiation field other than by changing the boundary array configuration itself. It will be seen hereinafter that an important feature of the present invention comprises the method by which the energy build up at the boundaries of the output field is accomplished.

Referring once again to FIG. 4 it will be seen that the boundary rays have been drawn in the three fields, namely, the input field ahead of the lens, the field within the lens and the output field. From the boundary rays and the field relative to the lens it is possible to calculate the slope angles of the surface elements at all points where the boundary rays intersect the surfaces. If the normals to each of these surface components are now projected onto each lenticulation axis, radii are established from which the surface sections between the boundary elements and the axes may be drawn as circular arcs. If the lenticulation surfaces were contoured to be congruent with these circular arcs, the resulting line lens would function to produce a flat sheet of radiation as required, but the radiation intensity pattern would be drastically deficient in energy at and near the boundaries. Accordingly, it is necessary to modify the circular curvatures of the exit surface of the lens point-by-point so that the rays in the output field are progressively crowded away from the axes and toward the boundaries. More specifically, each ray originating from an evenly spaced position in the source beam at the input to the lens is presumed to carry within it an equal amount of energy. Thus the energy density in any portion of the output field is increased as the spacing between the rays is reduced. Mathematically the energy density is equal to the inverse of the angular ray spacing.

The resulting surface elements will no longer have a mathematically circular curvature, but will instead be curves defined graphically by layout and mathematically by specific polynomial equations. The design of the novel line lens of the present invention is therefore complete when these polynomial designed curves are substituted for the circular arcs.

It will be noted hereinafter that in the particular embodiment of the invention herein disclosed only the exit surface contours of the line lens of the invention are being manipulated and the circular contours of the input surface are not changed. It has been found that for the particular output pattern requirements and the lens material used in the particular embodiment described, manipulation of the output surface alone was adequate to produce the desired energy distribution. However, it will be understood that the inventive design of the present invention contemplates, when required, manipulation of the input surface as well. In fact, it is expected that the combined action of manipulation of both surfaces would produce a more accurate and possibly more exotic radiation pattern. It is also known that many different combinations of surface curvatures between the two surfaces would produce the same radiation pattern and all such surface curvature manipulations carried out in accordance with the present invention are deemed to be contemplated by the scope of the claims hereinafter set forth. Furthermore, it will be seen hereinafter that the novel process of surface curvature manipulation for the exit surface of the lens would be equally applicable to the input surface as well.

Referring again to FIG. 4 it will be seen that the design of the lenticular output surface of the present invention commences with the circular arc surface segments previously discussed. A set of ten rays in the source beam spaced evenly over the beam radius was then traced through the beam spread lens of the invention. A graph was then constructed illustrating the relationship between the angle of the traced ten rays in the output field of the lens as a function of the ray intercept point at the exiting surface expressed in distance from the concave or convex axis of the lenticular pair depending upon which portion of the contour is being designed. This curve is plotted as curve 1 in FIG. 5. As can be seen from FIG. 5, curve 1, which is the relationship between the output angle of each ray and the distance from the axis of the lens, this relationship is nearly linear as seen by comparing curve 1 with the dotted straight line adjacent to it in FIG. 5. As previously indicated, in order to achieve the requirements for the line lens of the present invention it was deemed necessary to modify the optical characteristics of the circular arc output surface so that the rays in the output field are progressively crowded away from the axes toward the boundaries. In order to achieve this in terms of FIG. 5 it is necessary to alter the ray-to-ray angular spacing so that in effect, the rays are closer together towards the boundary of the output field. In order to achieve this, curve 2 in FIG. 5 was drawn empirically to provide a smooth transition from ray-to-ray with the angular ray spacing altered so that it is only 1/6 as great as that of curve 1 in the region between 43 degrees and 45 degrees as compared to the spacing of rays near the axis between 0 degrees and 12 degrees. The ratio 1/6 was an initial estimate of what it would take to bring the energy density up to the required levels as the output field approaches the 45 degree boundary.

The method of determining the actual curvature of the output lenticular surface to achieve the desired shift of beam rays toward the 45 degree boundary will be discussed more fully hereinafter. However, before describing this procedure it is to be noted that in design of the particular embodiment herein disclosed, a lens having the lenticular curvature corresponding to the ray-to-ray spacing characteristics of curve 2 of FIG. 5 was tested and found to be not sufficient to achieve the required characteristics. Accordingly, curve 2 was modified to provide an even smaller ratio of ray-to-ray spacing between 43 and 45 degrees as compared to the range of 0 to 12 degrees. A curve (not shown) finally used had a boundary ray to axis ray spacing ratio of approximately 1 to 7.

Figure 5:
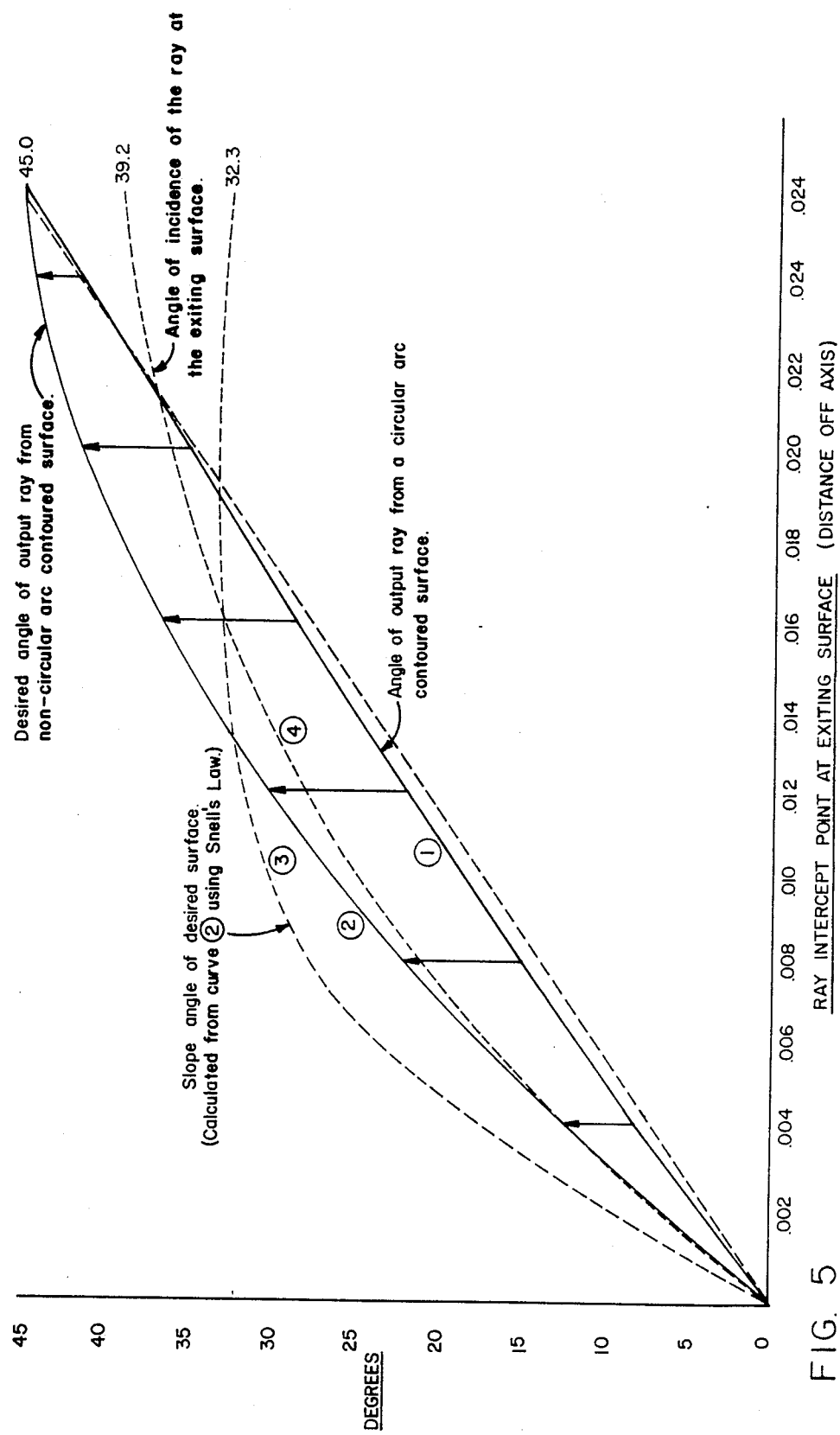
FIGS. 5 and 6 are graphical illustrations of various curves used in the design calculations of the lenticular surface contours of the line lens of the present invention.
Figure 6:
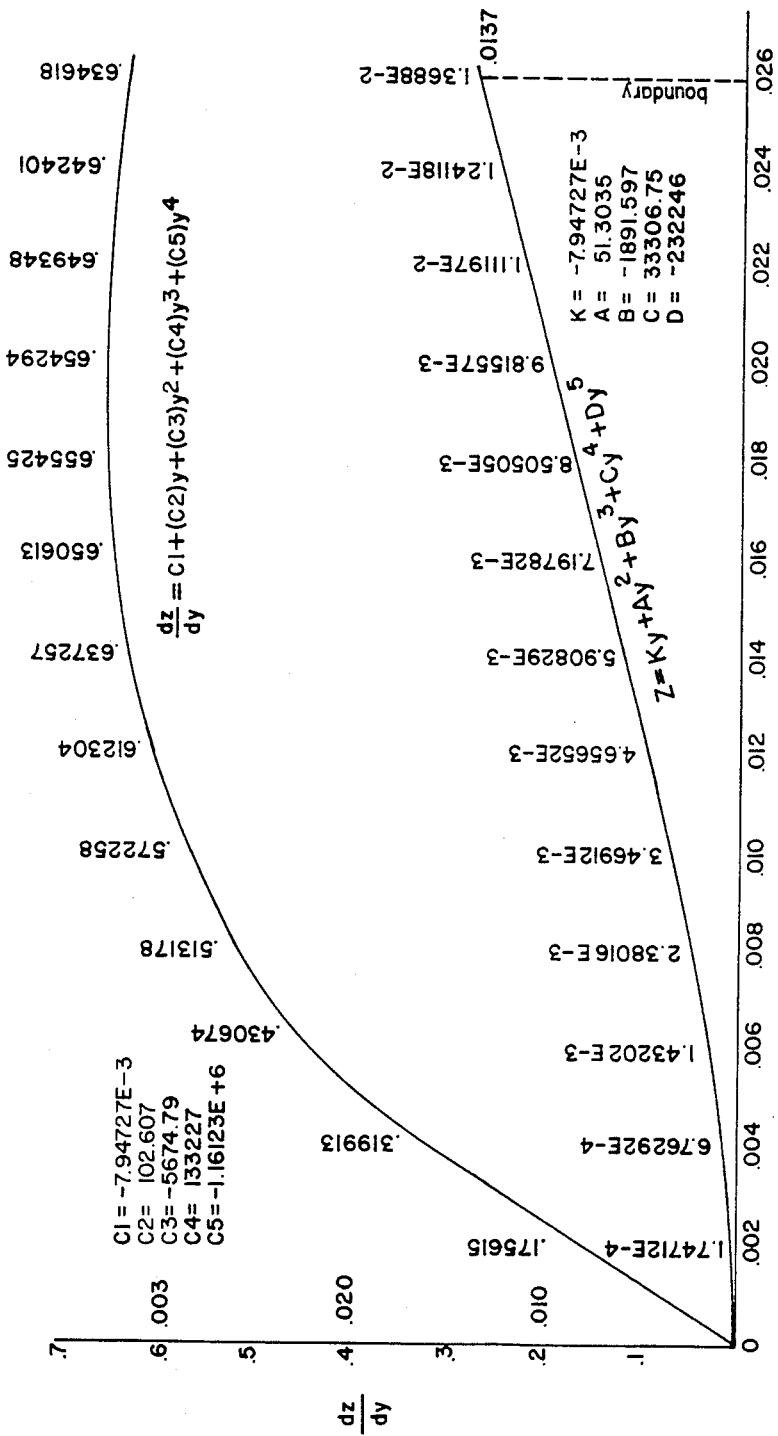

The method of determining the actual contour of the exit surface of the lens will now be described in conjunction with FIG. 6. In FIG. 6, the top curve is derived from curve 3 of FIG. 5 represents the tangent of the slope angles of the desired contour as a function of the distance from an axis of the lens. It will also be understood that because the top curve of FIG. 6 is a graph of the tangent of the slope angles of the lens surface, the equation describing the top curve of FIG. 6 defines the first derivature of the curve of the actual lens surface. Therefore, to generate the actual lens surface it is only necessary to perform an integration process of the top curve to produce the final curve of the refracting surface. In the present example, this integration process was achieved by first generating the equation for the top curve of FIG. 6. In an embodiment of this invention this equation was generated from the numerical values by utilizing a generally available computerized curve fitting program. This equation is defined immediately below the top curve of FIG. 6 with the constants of the resultant polynomial defined in the upper left-hand corner of FIG. 6. The bottom curve of FIG. 6 represents the integral of the top curve with the integration process being performed along the coordinate axis.

It is recognized that the integration process would be somewhat more accurate if it were performed along the final curve itself instead of along the coordinate axis. However, the integration error is trivial particularly in view of further empirical modifications that may be performed after the lens is complete and tested.

The equation of the bottom curve of FIG. 6 therefore represents the equation for the surface contour of the lenticulated exit surface of the lens of the invention along the concave portion thereof between points O and P as shown in FIG. 4. It will be understood that the curve for the convex portion is obtained in the same manner as described above. The various constants of the polynomial of the equation of the bottom curve of FIG. 6 are shown in the lower right-hand corner of that figure where Y and Z are SAG values indicated more specifically in Table I herein. The SAG values for the circular contoured input surface of the lens are listed in Table II and FIG. 7 provides an explanation of the SAG value coordinates for both surfaces over a single lenticulation cycle. The finalized complete structure of the lens embodiment described herein, is illustrated in two views of FIGS. 8 and 9.

Based on the above description of the design method of the present invention, it will be apparent that once it has been determined whether a double power surface for such a lens is necessary and mathematically simple contours have been preliminarily selected for the lenticulations for one or both surfaces of such a lens, the design method of the present invention proceeds as follows:

TABLE I

| SAG TABLE FOR POLYNOMIAL ARC CONTOURS (EXITING SURFACE) | |
|---|---|
| Y | Z |
| .040 | .02102 |
| .039 | .02094 |
| .038 | .02071 |
| .037 | .02036 |
| .036 | .01992 |
| .035 | .0194 |
| .034 | .01883 |
| .033 | .01822 |
| .032 | .01759 |
| .031 | .01694 |
| .030 | .01628 |
| .029 | .01563 |
| .028 | .01500 |
| .027 | .01433 |
| .026 | .01369 |
| .025 | .01305 |
| .024 | .01241 |
| .023 | .01177 |
| .022 | .01112 |
| .021 | .01047 |
| .020 | .00982 |
| .019 | .00916 |
| .018 | .00851 |
| .017 | .00785 |
| .016 | .00720 |
| .015 | .00655 |
| .014 | .00591 |
| .013 | .00528 |
| .012 | .00466 |
| .011 | .00405 |
| .010 | .00347 |
| .009 | .00291 |
| .008 | .00238 |
| .007 | .00189 |
| .006 | .00143 |
| .005 | .00103 |
| .004 | .00068 |

TABLE I-continued

SAG TABLE FOR POLYNOMIAL ARC
CONTOURS (EXITING SURFACE)

| Y | Z |
|---|---|
| .003 | .00039 |
| .002 | .00017 |
| .001 | .00004 |

TABLE II

SAG TABLE FOR CIRCULAR ARC
CONTOURS (ENTRANCE SURFACE)

| Y | Z |
|---|---|
| .040 | .00668 |
| .039 | .00667 |
| .038 | .00664 |
| .037 | .00660 |
| .036 | .00654 |
| .035 | .00647 |
| .034 | .00639 |
| .033 | .00630 |
| .032 | .00619 |
| .031 | .00607 |
| .030 | .00594 |
| .029 | .00579 |
| .028 | .00563 |
| .027 | .00546 |
| .026 | .00527 |
| .025 | .00507 |
| .024 | .00486 |
| .023 | .00463 |
| .022 | .00439 |
| .021 | .00414 |
| .020 | .00387 |
| .019 | .00359 |
| .018 | .00330 |
| .017 | .00291 |
| .016 | .00266 |
| .015 | .00230 |
| .014 | .00197 |
| .013 | .00168 |
| .012 | .00140 |
| .011 | .00116 |
| .010 | .00093 |
| .009 | .00074 |
| .008 | .00056 |
| .007 | .00041 |
| .006 | .00029 |
| .005 | .00018 |
| .004 | .00010 |
| .003 | .00005 |
| .002 | .00001 |
| .001 | .000 |

1. Determining the output angles of incident rays as a function of the distance along the exiting surface perpendicular to the axis of the lens for either the convex or concave contours;

2. From the aforementioned determination of output angles, next determining the ray spacing characteristics of the preliminary contours and particularly, how the ray spacing characteristics should be altered to change the energy distribution of the output radiation pattern to provide a new intensity variation in the output pattern which conforms to the desired specification. For example, in the embodiment of the invention described herein, it was found necessary to substantially decrease the ray spacing at angles in the output intensity pattern approaching the maximum desired limits of the beam spread wedge so that the ratio of angle spacing in this outer angle region of the wedge as compared to the angle spacing out or near the axis of a lenticulation cycle, would be considerably reduced;

3. Determining by empirical methods the curve representing the altered ray spacing characteristics to produce the desired new intensity pattern. Using this equation, then deriving the curve of the tangents of the slope angles of the lens surface as a function of the distance from the axis of the lenticulations, which is then converted to mathematical equation form by established curve fitting techniques;

4. Integrating the previously defined equation to generate an equation of the actual altered lens surface which will produce the altered ray spacing function;

5. Repeating the process for the remaining contours (concave or convex) of the output lens surface and as necessary, for the input lens surface as well, if required; and 6. Constructing a lens having one or more lenticulated surfaces as defined by the aforementioned steps.

Those having skill in the pertinent art will appreciate that the last listed step above, namely, constructing the lens in accordance with the altered equation of the lens surface is not a simple matter. In fact, a unique process has been employed to carry out such construction and this process shall now be described in sufficient detail to enable those skilled in the art to construct the lens upon the completion of the design in accordance with the invention. Reference will be made to FIGS. 10-13 which illustrate various apparatus used in the novel process of manufacture herein described.

Figure 10:
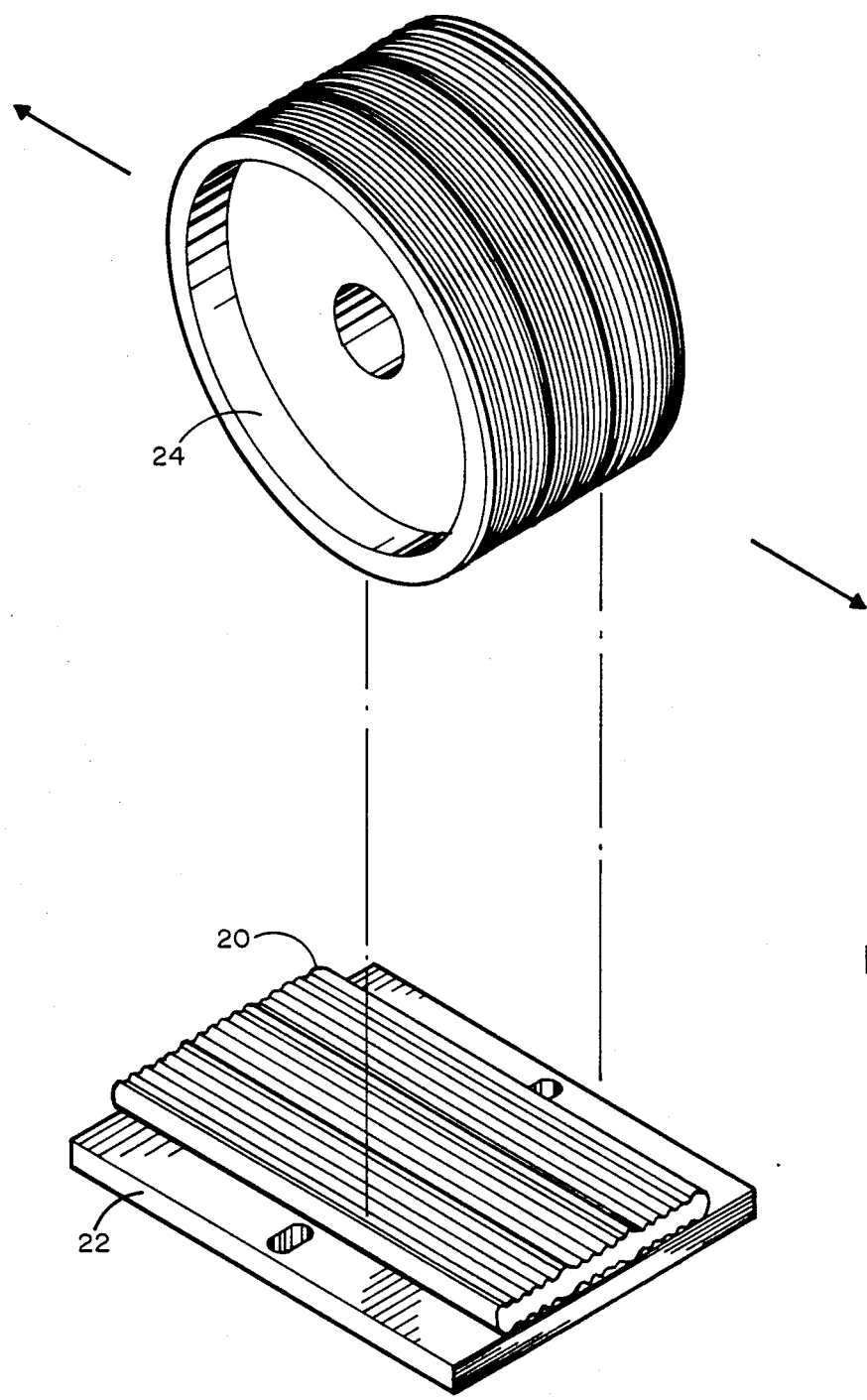
FIGS. 10–12 provide views of various apparatus used in the manufacture of the lens of the present invention.

More specifically, referring first to FIG. 10 it will be seen that in constructing the lens of the present invention, a lens plate 20 comprising a rectangular section of the applicable material, ZERODUR in the case of the embodiment herein disclosed, is affixed to a rectangular metal plate 22 which permits the lens material section to be handled precisely and accurately during the steps of the construction process. The actual construction process begins on a milling machine utilizing a diamond-coated generating wheel 24 illustrated in FIG. 10. Generating wheel 24 is a metal cylinder designed to be secured to the horizontal turret of the milling machine. The outer surface of the metal cylinder is clad with a fine grain diamond chip cylinder that has been previously shaped to provide a rough contour which is the obverse of the calculated lenticulated curve surface contour of the previously described design. The generating wheel is rotated on the milling machine and compressively engages the lens plate 20 to produce a rough replication of the desired contour on the previously flat lens plate surface. The milling machine is provided with a horizontal power feed which permits the generating wheel to move linearly in a reciprocating motion along the lens plate. Eventually the entire surface of plate 20 is homogeneously contoured by generating wheel 24 to achieve a rough shape closely approximating the desired surface lenticulations for one surface of the lens. Where the opposite surface of the lens is to be contoured, lens plate 20 is turned over and a second generating wheel is employed.

Figure 11:
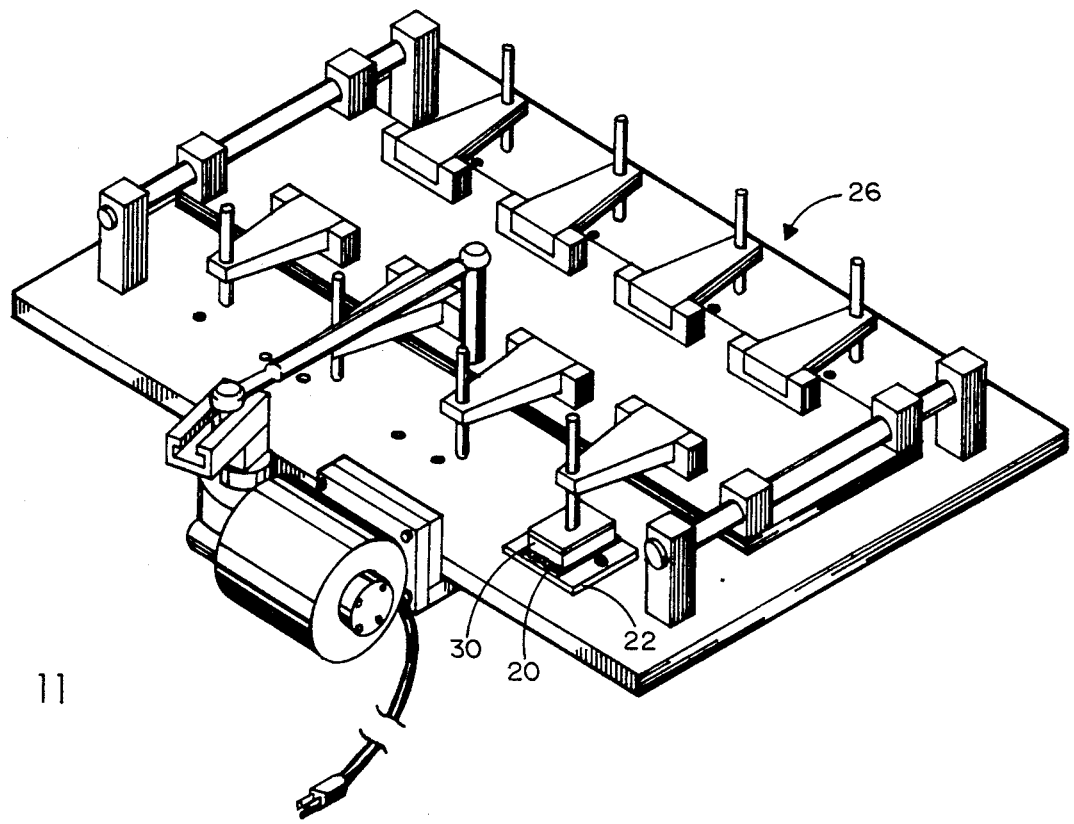
Figure 12:
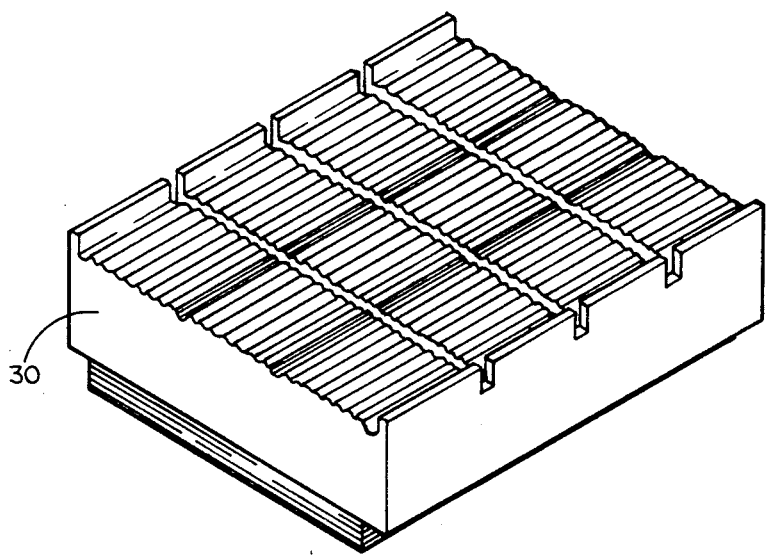

When this first step in the process has been completed, the lens plate is removed from the milling machine and secured in a lapping machine 26 shown in FIG. 11. The lapping machine serves to grind and polish lens plate 20 by again utilizing a reciprocating linear motion to drive a grinding fixture 30 which is in constant compressive engagement with the lens plate. The grinding fixture is illustrated in FIG. 12. The grinding fixture typically comprises a metal material such as brass which has been carefully machined to provide a grinding surface which is the obverse of the surface contour desired to be imparted to the lens. A number of such grinding fixtures may be provided, each having a different graded surface texture to permit a gradual decrease of the coarseness of the grinding surface. Those having skill in the art to which the machining process of the invention pertains, will appreciate that over a period of time, after being used to manufacture numerous lenses, the grinding fixture will begin to wear and that such wear would otherwise inadvertently alter the surface contour of the lenses being produced. Accordingly, a master grinding fixture is typically provided from a material such as cast iron. This cast iron master fixture is provided with a surface contour that is generated on an electronic discharge machine to precisely match the SAG values of the desired lens contour surface. Then the master grinding fixture is periodically applied to the grinding fixture 30 to restore the grinding surface of the grinding fixture as required to assure lens lenticulation contours which very closely match the design figures previously described.

After the grinding process has been completed, the grinding fixture is replaced in the lapping machine by a polishing fixture which is of similar shape but which has a pitch polishing substrate that has been shaped by compressive engagement with the master grinding fixture. A polishing compound, such as Cerium oxide, is applied to the pitch polishing substrate and the lapping machine is then employed in the same manner to compressively engage the polishing fixture and the lens plate in a constant, linearly reciprocating motion to finely polish the lens surface.

Upon completion of the polishing step, the lens plate 20 is then optically tested to determine whether all the various portions of the lens plate structure have been properly surfaced to achieve the desired optical characteristics. If the lens plate proves satisfactory in test, the plate is then cut into appropriately shaped sections by a saw bar. If necessary, an edge machine is then used to produce the desired lens shape which as previously indicated in conjunction with FIGS. 8 and 9, is circular in the embodiment disclosed. Each cut lens is thereafter tested again for a final determination of whether or not the finished lens product satisfies the radiation pattern specifications that have been established for that lens.

It will be understood that where both surfaces of the lens are to be lenticulated to achieve for example, the lens structure of the particular embodiment disclosed herein, each step of the process provides for application of surface contouring on both sides of the lens before the next step in the process is commenced. Thus, for example, where both sides of the lens are to be contoured to differing shapes, two diamond generating wheels are utilized in sequence. The first is used to generate the rough lenticulation shape of one surface of the lens. Then the lens plate is removed from the lens plate fixture, turned upside down and resecured to the fixture. The milling machine is then used with the second generating wheel to produce the rough surface of the opposite side of the lens plate. Similarly, the grinding and polishing steps of the process are applied alternatively to each side of the lens plate using the appropriate contoured fixture surfaces as appropriate for each lenticulation shape for the opposing sides of the lens.

It will now be understood that what has been disclosed herein comprises an improved line lens or beam spreader lens, a novel method of designing such a lens and a method of manufacturing such a lens. The lens converts a narrow, collimated round beam of radiation into a uniformly distributed sheet of radiation utilizing at least one lenticulated surface. A similar lens in the prior art achieves the desired output sheet of radiation over a 90 degree wedge generating a substantially uniform radiation pattern, but requires the use of a high index of refraction material such as LASF9 which has an index of refraction of 1.85. This material however suffers the disadvantage of being optically degraded with increasing temperature. This is a common problem encountered in many of the applications in which the lens is utilized. Accordingly, the present invention comprises such a lens using a material of substantially lower index of refraction such as glass ceramic but which is relatively insensitive to heat effects. The present invention also comprises a unique design method for calculating the contour surfaces of such a lens, and a novel means for producing a lens structure which satisfies the optical specifications of prior art devices but which does so utilizing a lens material having a substantially reduced index of refraction, namely, having an index of refraction of less than 1.6.

The invention herein disclosed comprises a novel design method for calculating the contours of a lenticulated surface to redistribute the optical energy in a beam spreader lens to achieve a desired intensity pattern. The novel design method disclosed herein has been applied to a specific embodiment of a lens structure of the invention to enable those having ordinary skill in the art to which the invention pertains to utilize that design method to achieve surface contours for any desired radiation pattern in a beam spreader lens. A novel method of manufacture for constructing such a uniquely designed lenticulated surface line lens has also been disclosed herein.

It will be understood that the specific embodiment of the line lens herein disclosed provides only one exemplary illustration for applying the design method of the invention and that virtually an unlimited number of other surface contour combinations achieve the desired radiation pattern specifications can be utilized as a result of the design method herein disclosed. As a result of the teaching herein, it will now be apparent that numerous modifications and additions may be made to the invention herein disclosed, however all such modifications and additions are contemplated as being within the scope of the invention which is to be limited only by the claims appended hereto.

We claim:

1. A method of constructing a lens of the type receiving a collimated beam of input radiation for transmitting a narrow sheet of output radiation of substantially uniform intensity over an angular range of approximately + and −45 degrees relative to the input radiation beam, the lens being constructed from an optically transmissive material having an index of refraction no greater than 1.6; the method comprising the following steps:
   a. selecting the number of lens surfaces that will be required to affect the incoming radiation beam for a given transmissive material,
   b. providing each surface selected in step a. with lenticulations comprising alternating convex and concave elements having mathematically simple contours such as circular arcs,
   c. determining the output radiation angles of incident beam rays as a function of the distance along the exiting surface of a lenticulation element,
   d. applying a modification factor to the output radiation angle spacing to achieve a desired output radiation intensity pattern as a function of angle relative to the input radiation beam,
e. determining the curve representing the altered output radiation spacing,
f. deriving the mathematical equation of the curve of the tangents of the slope angles of the lens surface as a function of the distance from the axis of the lenticulation elements,
g. integrating the equation determined in step f. to generate the equation of the lens surface element contour which provides the altered output radiation spacing,
h. repeating steps c. through g. for each additional lens surface element contour which must be also altered to achieve the desired output radiation pattern for the entire lens, and
i. defining the entire lens geometry in accordance with the results of steps a. through h.,
j. constructing a generating wheel for each surface selected in step a., each such wheel having a contour approximately equal to the obverse of the geometry for the corresponding surface as defined in step i.,
k. generating rough lenticulated surfaces on a plate of said transmissive material by rotating said generating wheels while each such wheel is in compressive linearly reciprocating engagement with the corresponding surface,
l. constructing a grinding fixture for each surface selected in step a., each such fixture having a contour approximately equal to the obverse of the geometry for the corresponding surface as defined in step i.,
m. grinding the respective surfaces of said plate of transmissive material with the corresponding grinding fixture while each such fixture is in compressive linearly reciprocating engagement with the corresponding surface,
n. polishing each of said surfaces, and
o. cutting said plate into a plurality of lenses.

* * * * *